United States Patent
Lee et al.

(10) Patent No.: US 9,461,779 B2
(45) Date of Patent: Oct. 4, 2016

(54) METHOD FOR TRANSMITTING UPLINK DATA INFORMATION IN A WIRELESS COMMUNICATION SYSTEM AND APPARATUS THEREFOR

(71) Applicant: LG ELECTRONICS INC., Seoul (KR)

(72) Inventors: Seungmin Lee, Anyang-si (KR); Hanbyul Seo, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 34 days.

(21) Appl. No.: 14/376,494

(22) PCT Filed: Feb. 26, 2013

(86) PCT No.: PCT/KR2013/001531
§ 371 (c)(1),
(2) Date: Aug. 4, 2014

(87) PCT Pub. No.: WO2013/125930
PCT Pub. Date: Aug. 29, 2013

(65) Prior Publication Data
US 2015/0023269 A1    Jan. 22, 2015

Related U.S. Application Data

(60) Provisional application No. 61/603,369, filed on Feb. 26, 2012.

(51) Int. Cl.
*H04L 1/18* (2006.01)
(52) U.S. Cl.
CPC .......... *H04L 1/1861* (2013.01); *H04L 1/1822* (2013.01); *H04L 1/1887* (2013.01); *H04L 1/1812* (2013.01)

(58) Field of Classification Search
None
See application file for complete search history.

(56) References Cited

U.S. PATENT DOCUMENTS

| 2006/0084389 | A1 | 4/2006 | Beale et al. |
| 2009/0249153 | A1 | 10/2009 | Zhang |
| 2011/0176461 | A1* | 7/2011 | Astely .......... H04B 7/2656 370/280 |
| 2013/0188516 | A1* | 7/2013 | He .......... H04W 28/16 370/254 |
| 2014/0153529 | A1 | 6/2014 | Marinier et al. |

FOREIGN PATENT DOCUMENTS

| CA | 2655714 A1 | 1/2008 |
| KR | 10-2007-0068465 A | 6/2007 |
| KR | 10-2008-0005036 A | 1/2008 |
| KR | 10-2009-0042334 A | 4/2009 |
| KR | 10-2010-0139062 A | 12/2010 |

* cited by examiner

*Primary Examiner* — Huy D Vu
*Assistant Examiner* — Teisha D. Hall
(74) *Attorney, Agent, or Firm* — Birch, Stewart, Kolasch & Birch, LLP

(57) ABSTRACT

The present invention relates to a method for transmitting uplink data information in a wireless communication system, and an apparatus therefor. Specifically, the method for a terminal for transmitting uplink data information by means of a hybrid automatic repeat request (HARQ) comprises the steps of: configuring at least one uplink subframe on the basis of first HARQ process; changing a particular uplink subframe, from among the uplink subframes, to a downlink subframe; receiving, from a base station, an indication information indicating the change from the first HARQ process to a second HARQ process; reconfiguring, in accordance with the indication information, at least one uplink subframe on the basis of the second HARQ process; and transmitting uplink data information by means of the reconfigured uplink subframe.

8 Claims, 18 Drawing Sheets

FIG. 2
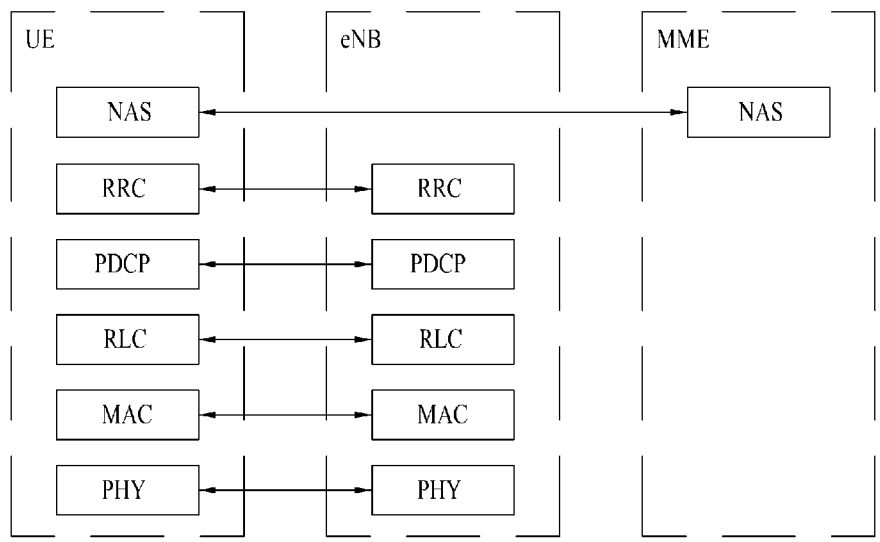
(a) Control-Plane Protocol Stack
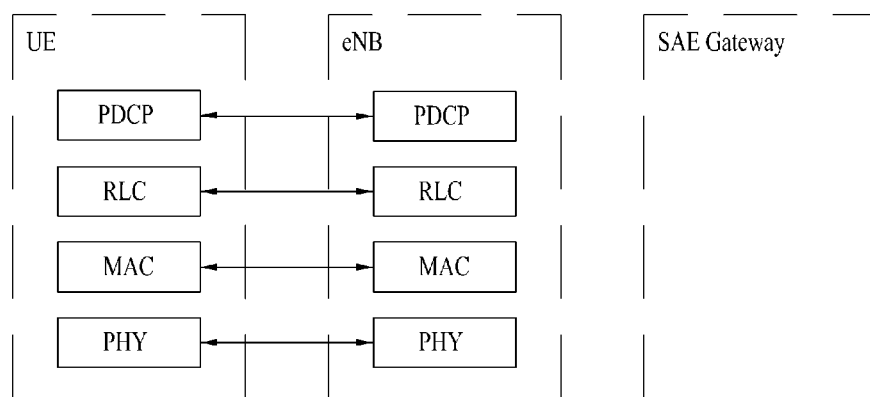
(b) User-Plane Protocol Stack FIG. 12
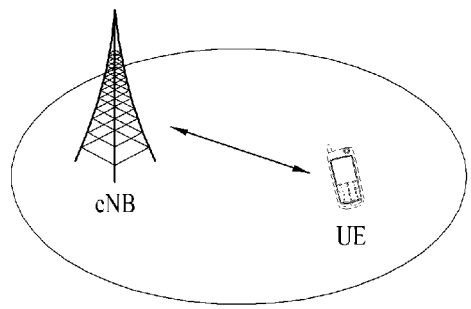
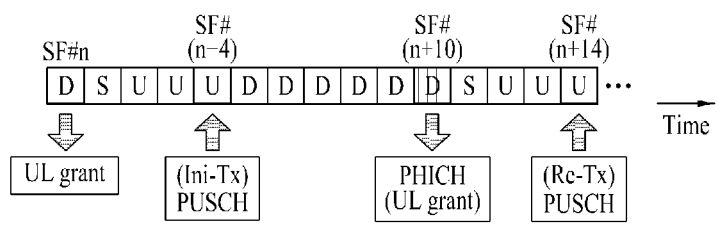
(a) Normal UL HARQ process operation
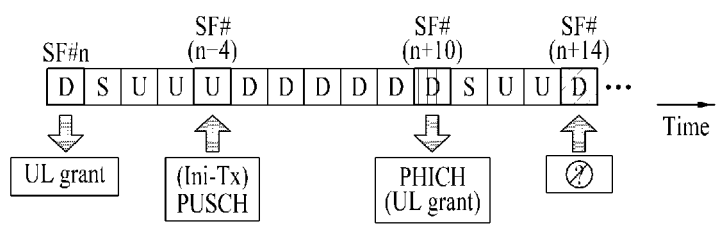
(b) Occurrence of problems in UL HARQ process operation

FIG. 15

| UL-DL configuration #1<br>Maximum number of UL HARQ processes = 4 | | UL grant<br>Reception timing | PUSCH<br>(Re)transmission timing | PHICH<br>(UL grant)<br>Reception timing |
|---|---|---|---|---|
| Change rule #1 | UL<br>HARQ Process #A | SF#n<br>('n=6') | SF#(n+6) | SF#(n+10) |
| | UL<br>HARQ Process #A' | SF#n<br>('n=9') | SF#(n+4) | SF#(n+10) |
| Change rule #2 | UL<br>HARQ Process #B | SF#n<br>('n=1') | SF#(n+6) | SF#(n+10) |
| | UL<br>HARQ Process #B' | SF#n<br>('n=4') | SF#(n+4) | SF#(n+10) |
| Change rule #3 | UL<br>HARQ Process #C | SF#n<br>('n=9') | SF#(n+4) | SF#(n+10) |
| | UL<br>HARQ Process #C' | SF#n<br>('n=1') | SF#(n+6) | SF#(n+10) |
| Change rule #4 | V<br>HARQ Process #D | SF#n<br>('n=4') | SF#(n+4) | SF#(n+10) |
| | UL<br>HARQ Process #D' | SF#n<br>('n=6') | SF#(n+6) | SF#(n+10) | ized radio communication system. An evolved universal mobile telecommunications system (E-UMTS) is an advanced version of a legacy universal mobile telecommunications system (UMTS) and basic standardization thereof is currently underway in the 3GPP. E-UMTS may be referred to as an LTE system. For details of the technical specifications of UMTS and E-UMTS, reference can be made to Release 7 and Release 8 of "3rd Generation Partnership Project; Technical Specification Group Radio Access Network".

METHOD FOR TRANSMITTING UPLINK DATA INFORMATION IN A WIRELESS COMMUNICATION SYSTEM AND APPARATUS THEREFOR

CROSS REFERENCE TO RELATED APPLICATIONS

This application is the National Phase of PCT International Application No. PCT/KR2013/001531, filed on Feb. 26, 2013, which claims priority under 35 U.S.C. 119(e) to U.S. Provisional Application No. 61/603,369, filed on Feb. 26, 2012, all of which are hereby expressly incorporated by reference into the present application.

TECHNICAL FIELD

The present invention relates to a wireless communication system and, more particularly, to a method for transmitting an uplink data information and an apparatus therefor.

BACKGROUND ART

As an example of a mobile communication system to which the present invention is applicable, a 3rd generation partnership project long term evolution (3GPP LTE) (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in the 3GPP. E-UMTS may be referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink (DL) or uplink (UL) transmission service to multiple UEs. Different cells may be configured to provide different bandwidths. The eNB controls data transmission and reception to and from a plurality of UEs. Regarding DL data, the eNB transmits DL scheduling information to notify a corresponding UE of a time/frequency domain within which data is to be transmitted, coding, data size, and hybrid automatic repeat and request (HARQ)-related information. In addition, regarding UL data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of the UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simplified structure, open interface, appropriate power consumption of a UE, etc. are required.

DISCLOSURE

Technical Problem

An object of the present invention is to provide a method for transmitting uplink data information in a wireless communication system and an apparatus therefor.

The technical objects that can be achieved through the present invention are not limited to what has been particularly described hereinabove and other technical objects not described herein will be more clearly understood by persons skilled in the art from the following detailed description.

Technical Solution

In an aspect of the present invention for achieving the present invention, provided herein is a method for transmitting uplink data information using hybrid automatic repeat request (HARQ) of a user equipment in a wireless communication system, including configuring at least one uplink subframe according to a first HARQ process; changing a specific uplink subframe among uplink subframes to a downlink subframe; receiving indication information indicating that the first HARQ process is changed to a second HARQ process from a base station; reconfiguring the at least one uplink subframe based on the second HARQ process according to the indication information; and transmitting uplink data information using the reconfigured uplink subframe.

The uplink subframe reconfigured according to the second HARQ process may be different from the at least one uplink subframe configured according to the first HARQ process.

The first HARQ process and the second HARQ process may be determined from a HARQ process set based on configuration information including uplink scheduling information.

The configuration information may include information about specific uplink-downlink configuration.

The first HARQ process may be determined by reception timing of the uplink scheduling information.

The indication information may be received at timing at which uplink scheduling information of the second HARQ process is received. The indication information may not be received at timing at which uplink scheduling information of the first HARQ process is received.

The indication information may be additionally included in downlink control information for scheduling an uplink resource.

In another aspect of the present invention for achieving the present invention, provided herein is a user equipment for transmitting uplink data information using hybrid automatic repeat request (HARQ) in a wireless communication system, including a radio frequency (RF) unit; and a processor, wherein the processor is configured to configure at least one uplink subframe according to a first HARQ process and change a specific uplink subframe among uplink subframes to a downlink subframe, the RF unit is configured to receive indication information indicating that the first HARQ process is changed to a second HARQ process from a base station, and the processor is configured to reconfigure the at least one uplink subframe based on the second HARQ process upon receiving the indication information and transmit uplink data information using the reconfigured uplink subframe.

Advantageous Effects

According to the present invention, UL data information can be efficiently transmitted when a radio resource is dynamically changed for DL communication according to system traffic in a method for transmitting UL data information in a wireless communication system.

The effects that can be achieved through the present invention are not limited to what has been particularly described hereinabove and other advantages not described herein will be more clearly understood by persons skilled in the art from the following detailed description.

DESCRIPTION OF DRAWINGS

The accompanying drawings, which are included to provide a further understanding of the invention, illustrate embodiments of the invention and together with the description serve to explain the principle of the invention.

FIG. 2 illustrates structures of a control plane and a user plane of a radio interface protocol between a UE and an E-UTRAN based on the 3GPP radio access network specification.

FIG. 12 illustrates an embodiment in which problems occur in a UL HARQ process operation when use of a specific radio resource is changed.

FIG. 15 illustrates definition of a change operation and relationship between preset HARQ processes.

BEST MODE

Figure 1:
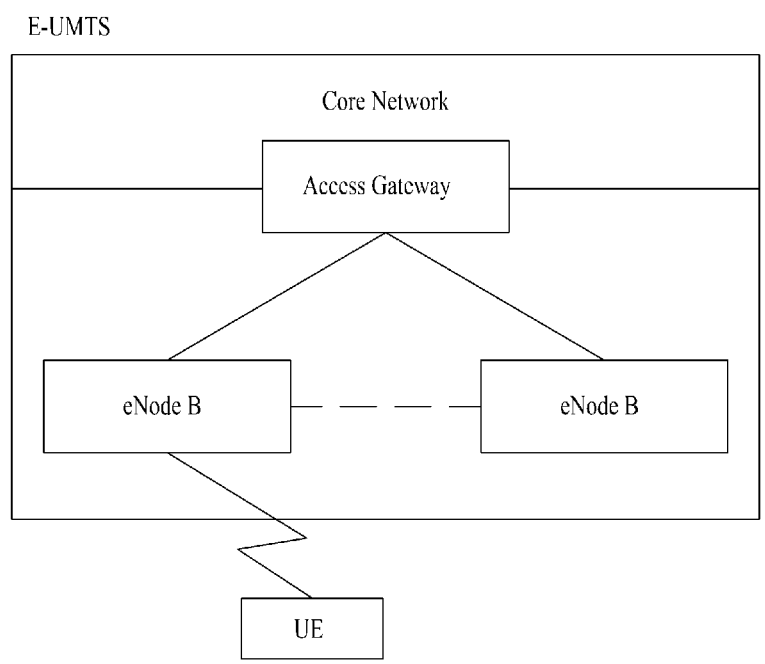
FIG. 1 illustrates a network structure of an E-UMTS as an exemplary radio communication system.

The following technology may be applied to a variety of wireless access systems using code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communications (GSM)/general packet radio service (GPRS)/enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802-20, and evolved UTRA (E-UTRA). UTRA is a part of a universal mobile telecommunications system (UMTS). 3GPP LTE is a part of evolved UMTS (E-UMTS) using E-UTRA. 3GPP LTE employs OFDMA in DL and SC-FDMA in UL. LTE-advanced (LTE-A) is an evolved version of 3GPP LTE.

For clarity of description, the following description focuses on the 3GPP LTE/LTE-A system. However, the technical features of the present invention are not limited thereto. Specific terms used in the following description are provided to aid in understanding the present invention. These specific terms may be replaced with other terms within the scope and spirit of the present invention.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer, which is a first layer, provides an information transfer service to an upper layer using a physical channel. The physical layer is connected to a media access control (MAC) layer of an upper layer via a transmission channel (an antenna port channel). Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an OFDMA scheme in DL and is modulated using an SC-FDMA scheme in UL.

The MAC layer, which is a second layer, provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting an eNB is configured to use one of bandwidths of 1.4, 3, 5, 10, and 20 MHz to provide a DL or UL transmission service to a plurality of UEs. Different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
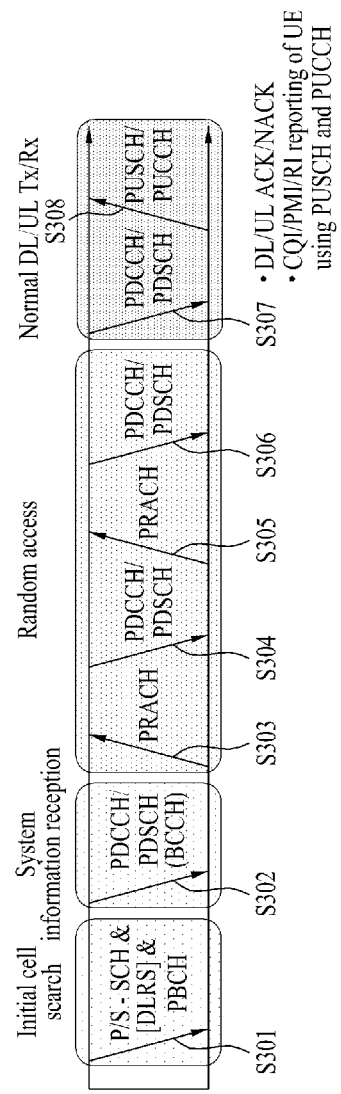
FIG. 3 illustrates physical channels used in a 3GPP system and a general signal transmission method using the same.

FIG. 3 is a diagram illustrating physical channels used in a 3GPP system and a general signal transmission method using the same.

When a UE is powered on or enters a new cell, the UE performs initial cell search such as synchronization acquisition with an eNB in step S301. To this end, the UE may receive a primary synchronization channel (P-SCH) and a secondary synchronization channel (S-SCH) from the eNB, establish synchronization with the eNB, and acquire information such as a cell identity (ID). Thereafter, the UE may receive a physical broadcast channel (PBCH) from the eNB to acquire information broadcast in the cell. Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S302.

Next, the UE may perform a random access procedure such as steps S303 to S306 to complete access to the eNB. To this end, the UE may transmit a preamble through a physical random access channel (PRACH) (S303) and receive a response message to the preamble through the PDCCH and the PDSCH corresponding to the PDCCH (S304). In the case of contention-based random access, a contention resolution procedure including transmission of a PRACH signal (S305) and reception of a PDCCH signal and a PDSCH signal corresponding to the PDCCH signal (S306) may be additionally performed.

The UE which has performed the above procedures may receive a PDCCH and/or PDSCH signal (step S307) and transmit a physical uplink shared channel (PUSCH) and/or physical uplink control channel (PUCCH) signal (step S308) according to a general UL/DL signal transmission procedure. Control information that the UE transmits to the eNB is referred to as uplink control information (UCI). The UCI includes a hybrid automatic repeat and request (HARQ) acknowledgement (ACK)/negative ACK (NACK), a scheduling request (SR), channel state information (CSI), etc. In the present disclosure, HARQ ACK/NACK is shortened to HARQ-ACK or ACK/NACK (A/N). HARQ-ACK includes at least one of positive ACK (simply, ACK), negative ACK (simply, NACK), discontinuous transmission (DTX), and NACK/DTX. The CSI includes a channel quality indicator (CQI), a precoding matrix index (PMI), a rank indicator (RI), etc. While UCI is generally transmitted on a PUCCH, if control information and traffic data are to be transmitted simultaneously, the UCI may be transmitted on a PUSCH. The UCI may be transmitted aperiodically on the PUSCH upon request/command of a network.

Figure 4:
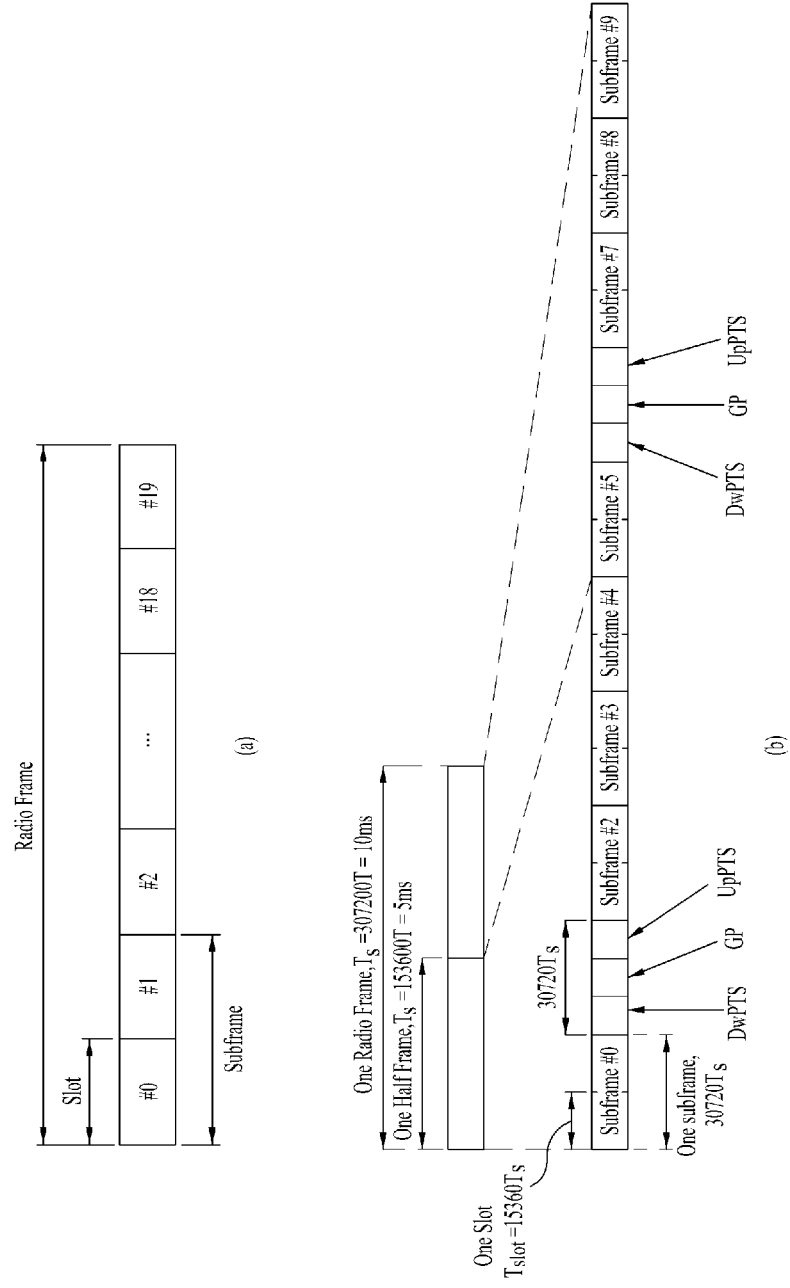
FIG. 4 illustrates the structure of a radio frame used in an LTE system.

FIG. 4 is a diagram illustrating the structure of a radio frame used in an LTE system.

Referring to FIG. 4, in a cellular orthogonal frequency division multiplexing (OFDM) wireless packet communication system, UL/DL data packets are transmitted in subframes. One subframe is defined as a predetermined time interval including a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating the structure of the type 1 radio frame. A DL radio frame includes 10 subframes, each subframe including two slots in the time domain. A time required to transmit one subframe is defined as a Transmission Time Interval (TTI). For example, one subframe may be 1 ms long and one slot may be 0.5 ms long. One slot includes a plurality of OFDM symbols in the time domain and a plurality of resource blocks (RBs) in the frequency domain. Since 3GPP LTE uses OFDMA for DL, an OFDM symbol is one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a cyclic prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is unstable, as is the case when the UE rapidly moves, the extended CP may be used in order to further reduce inter-symbol interference.

In the case of the normal CP, since one slot includes 7 OFDM symbols, one subframe includes 14 OFDM symbols. Up to first three OFDM symbols of each subframe may be allocated to a PDCCH and the remaining OFDM symbols may be allocated to a PDSCH.

FIG. 4(b) illustrates the structure of the type 2 radio frame. The type 2 radio frame includes two half frames, each half frame including four general subframes each having two slots and one special subframe including a downlink pilot time slot (DwPTS), a guard period (GP), and an uplink pilot time slot (UpPTS).

In the special subframe, the DwPTS is used for initial cell search, synchronization, or channel estimation at a UE, and the UpPTS is used for channel estimation and UL transmission synchronization with a UE at an eNB. That is, the DwPTS is used for DL transmission and the UpPTS is used for UL transmission. Particularly, the UpPTS is used for transmission of a PRACH preamble or a sounding reference signal (SRS). The GP is used to cancel UL interference between UL and DL, caused by multi-path delay of a DL signal.

The current 3GPP standard specification defines the following configurations listed in Table 1 below for the special subframe. Table 1 illustrates DwPTSs and UpPTSs in the case where $T_s=1/(15000\times2048)$. The remaining region except for a DwPTS and an UpPTS is set as a GP.

slot includes 7 OFDM symbols and an RB includes 12 subcarriers, the present invention is not limited thereto. For example, the number of OFDM symbols included in the DL slot may differ according to CP length.

Each element on the resource grid is referred to as a resource element (RE). One RE indicated by one OFDM symbol index and one subcarrier index. One RB includes $N_{symb}^{DL} \times N_{sc}^{RB}$ REs. The number of RBs, $N_{RB}^{DL}$, included in a DL slot depends on DL bandwidth configured in a cell.

Figure 6:
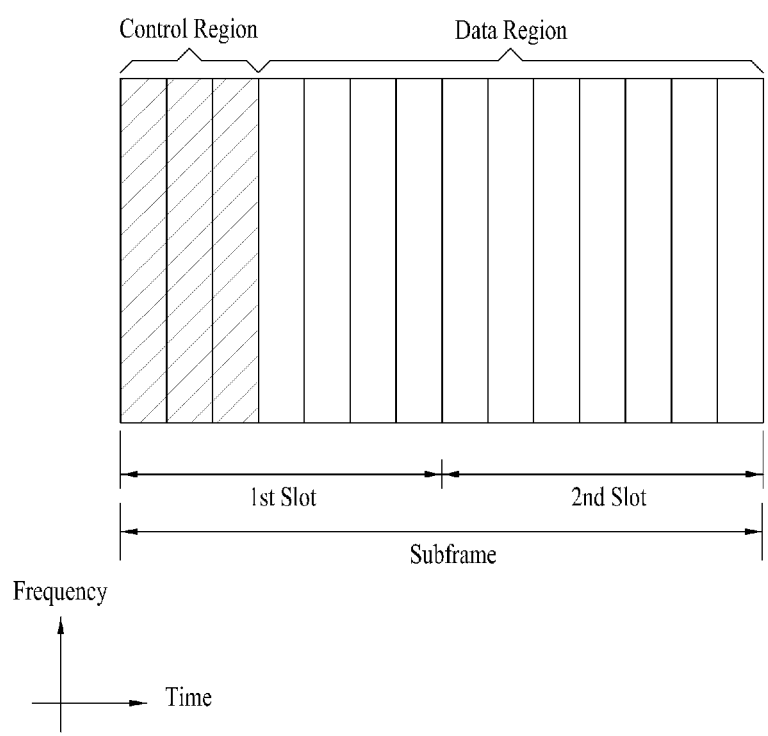
FIG. 6 illustrates the structure of a DL subframe.

FIG. 6 illustrates the structure of a DL subframe.

Referring to FIG. 6, up to three or four OFDM symbols at the start of the first slot of a DL subframe are used as a control region to which control channels are allocated and the other OFDM symbols of the DL subframe are used as a data region to which a PDSCH is allocated. DL control

TABLE 1

| | | Normal cyclic prefix in downlink | | | Extended cyclic prefix in downlink | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Meanwhile, the type 2 radio frame structure, that is, UL/DL subframe configurations in a TDD system are listed in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. Table 2 further illustrates DL-to-UL switch point periodicities for the respective UL/DL subframe configurations in the system.

The above-described structures of radio frames are purely exemplary. Accordingly, the number of subframes in a radio frame, the number of slots in a subframe, and the number of symbols in a slot may be changed in various manners.

Figure 5:
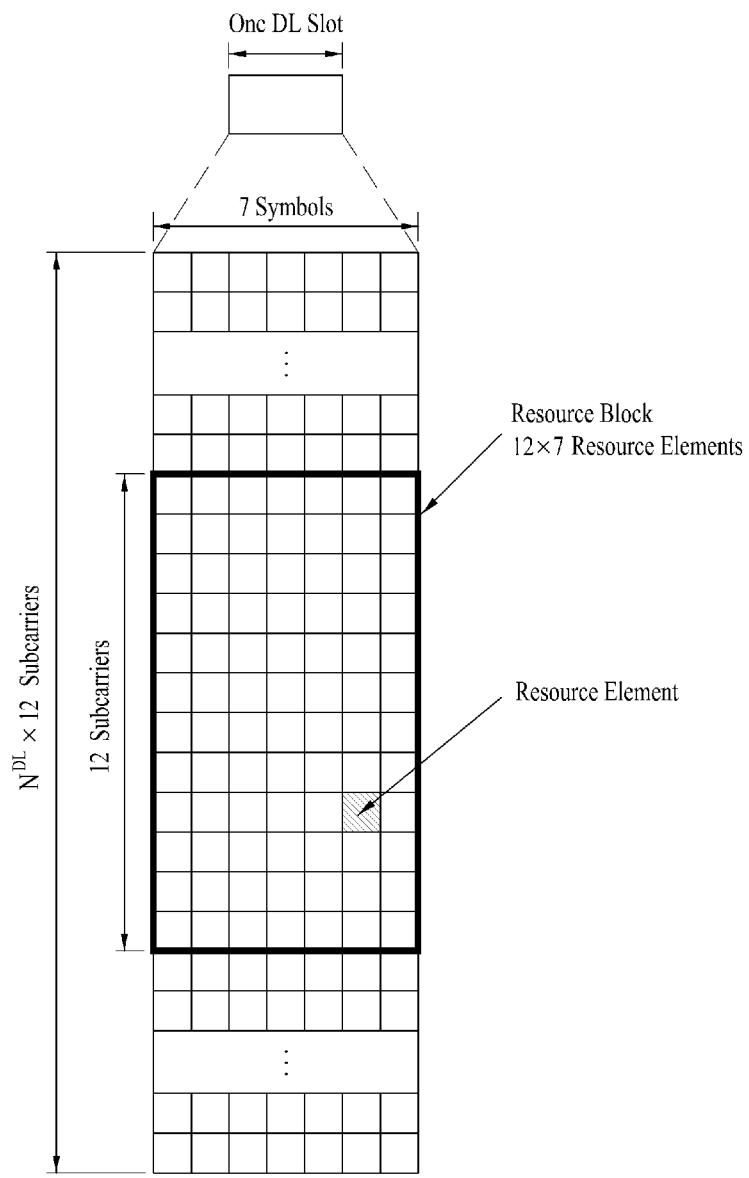
FIG. 5 illustrates a resource grid of a DL slot.

FIG. 5 illustrates a resource grid of a DL slot.

Referring to FIG. 5, a DL slot includes $N_{symb}^{DL}$ OFDM symbols in the time domain and $N_{RB}^{DL}$ RBs in the frequency domain. Each RB includes $N_{sc}^{RB}$ subcarriers and thus the DL slot includes $N_{RB}^{DL} \times N_{sc}^{RB}$ subcarriers in the frequency domain. Although FIG. 5 illustrates the case in which a DL channels defined for the LTE system include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH delivers a HARQ ACK/NACK signal as a response to UL transmission.

Control information carried on the PDCCH is called downlink control information (DCI). The DCI transports resource allocation information and other control information for a UE or a UE group. For example, the DCI includes DL/UL scheduling information, UL transmit (Tx) power control commands, etc.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, transmit power control commands, voice over Internet protocol (VoIP) activation indication information, etc. A plurality of PDCCHs may be transmitted in the control region. A UE may monitor a plurality of PDCCHs. A PDCCH is transmitted on an aggregate of one or more consecutive control channel elements (CCEs). A CCE is a logical allocation unit used to provide a PDCCH at a coding rate based on the state of a radio channel. A CCE includes a plurality of resource element groups (REGs). The format of a PDCCH and the number of available bits for the PDCCH are determined according to the number of CCEs. An eNB determines a PDCCH format according to DCI transmitted to a UE and attaches a cyclic redundancy check (CRC) to control information. The CRC is masked by an identifier (ID) (e.g. a radio network temporary identifier (RNTI)) according to the owner or use of the PDCCH. If the PDCCH is destined for a specific UE, the CRC may be masked by a cell-RNTI (C-RNTI) of the UE. If the PDCCH carries a paging message, the CRC thereof may be masked by a paging ID (P-RNTI). If the PDCCH carries system information (particularly, a system information block (SIB)), the CRC thereof may be masked by a system information RNTI (SI-RNTI). If the PDCCH is designated as a random access response, the CRC thereof may be masked by a random access-RNTI (RA-RNTI).

Figure 7:
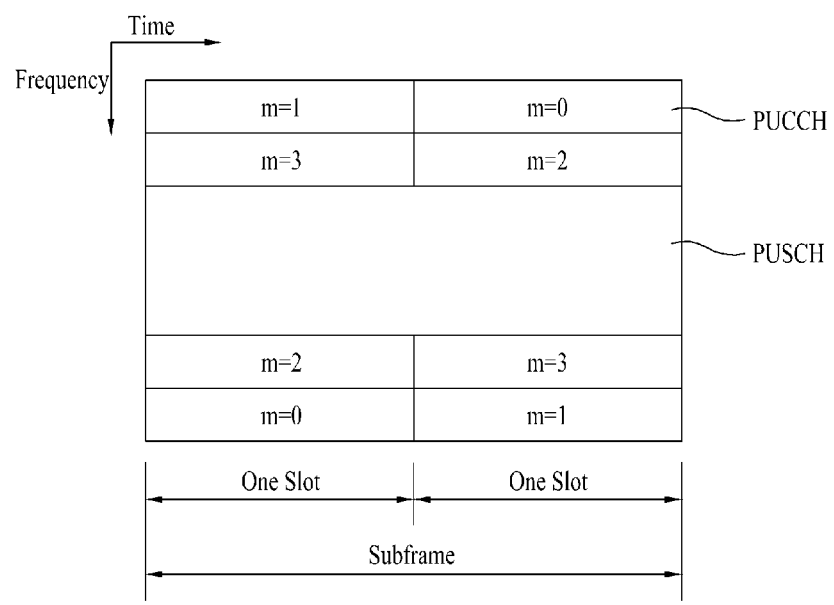
FIG. 7 illustrates the structure of a UL subframe in an LTE system.

FIG. 7 illustrates the structure of a UL subframe in an LTE system.

Referring to FIG. 7, a UL subframe includes a plurality of (e.g. 2) slots. A slot may include a different number of SC-FDMA symbols according to CP length. The UL subframe is divided into a control region and a data region in the frequency domain. The data region includes a PUSCH to transmit a data signal such as voice and the control region includes a PUCCH to transmit UCI. The PUCCH occupies a pair of RBs at both ends of the data region in the frequency domain and the RB pair frequency-hops over a slot boundary.

The PUCCH may deliver the following control information.
  SR: SR is information requesting UL-SCH resources and is transmitted using on-off keying (OOK).
  HARQ ACK/NACK: HARQ ACK/NACK is a response signal to a DL data packet received on a PDSCH, indicating whether the DL data packet has been received successfully. 1-bit ACK/NACK is transmitted as a response to a single DL codeword and 2-bit ACK/NACK is transmitted as a response to two DL codewords.
    CSI: CSI is feedback information regarding a DL channel. CSI includes a CQI and multiple input multiple output (MIMO)-related feedback information includes an RI, a PMI, a precoding type indicator (PTI), etc. The CSI occupies 20 bits per subframe.

The amount of UCI that the UE may transmit in a subframe depends on the number of SC-FDMA symbols available for transmission of control information. The remaining SC-FDMA symbols except for SC-FDMA symbols allocated to RSs in a subframe are available for transmission of control information. If the subframe carries an SRS, the last SC-FDMA symbol of the subframe is also excluded in transmitting the control information. The RSs are used for coherent detection of the PUCCH.

Hereinafter, HARQ in a wireless communication system will be described.

In a wireless communication system, if a plurality of UEs having data to be transmitted on UL/DL is present, an eNB selects UEs that will transmit data in every transmission time interval (TTI) (e.g. subframe). In particular, in a system operated using multiple carriers and the like, the eNB selects UEs that are to transmit data on UL/DL in each TTI and selects a frequency band used for the UE to transmit data.

In the case of UL transmission, UEs transmit reference signals (or pilot signals) on UL and the eNB checks channel states of the UEs using the reference signals transmitted from the UEs and selects UEs, which will transmit data on UL in unit frequency bands thereof, per TTI. The eNB informs the UEs of the selected results. That is, the eNB transmits a UL assignment message instructing a UL scheduled UE to transmit data using a specific frequency band in a specific TTI. The UL assignment message is also referred to as a UL grant. The UE transmits data on UL in response to the UL assignment message. The UL assignment message may include a UE identity (ID), RB allocation information, and payload information and may further include an incremental redundancy (IR) version, new data indicator (NDI), etc.

In the case of synchronous non-adaptive HARQ, when a UE scheduled at a specific time performs data retransmission, a retransmission time is systematically decided in advance (e.g. 4 subframes after NACK reception). Accordingly, the eNB can transmit a UL grant message to the UE only during initial transmission and retransmission following the initial transmission is performed according to an ACK/NACK signal. In the case of asynchronous adaptive HARQ, a retransmission time is not decided in advance and thus the eNB needs to transmit a retransmission request message. Furthermore, since a frequency resource or a modulation and coding scheme (MCS) for retransmission varies according to transmission time, the eNB needs to transmit the retransmission request message together with a UE ID, RB allocation information, payload, a HARQ process index, an IR version, and an NDI.

Figure 8:
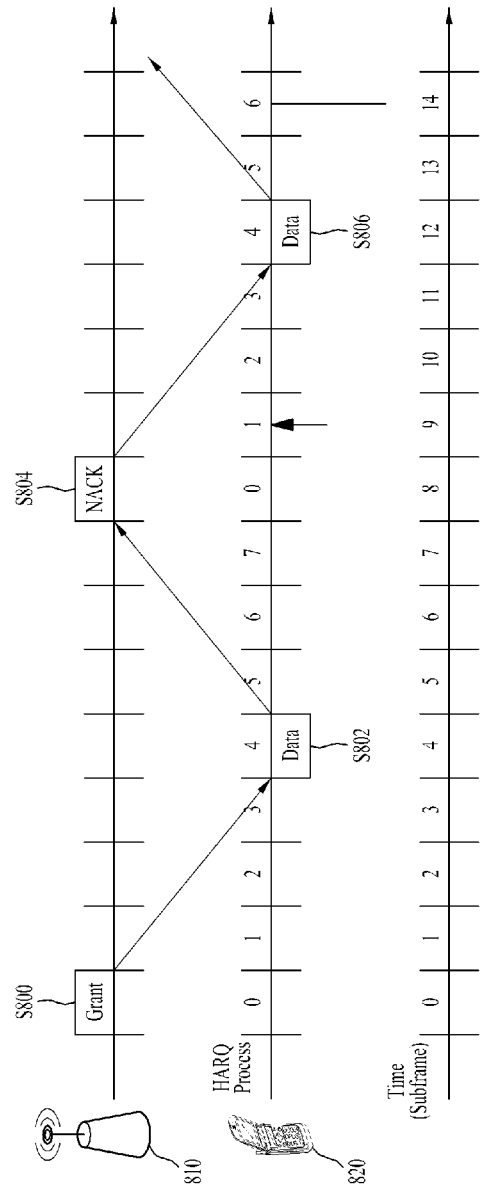
FIG. 8 illustrates a UL HARQ operation in an LTE system.

FIG. 8 illustrates a UL HARQ operation in an LTE system. The LTE system uses synchronous non-adaptive HARQ as a UL HARQ scheme. When 8-channel HARQ is used, HARQ process numbers 0 to 7 are given. A HARQ process is performed per TTI (e.g. subframe). Referring to FIG. 8, an eNB 810 transmits a UL grant to a UE 820 through a PDCCH (S800). The UE 820 transmits UL data to the eNB 810 using an RB and MCS indicated by the UL grant 4 subframes (e.g. subframe #4) after the UL grant is received (e.g. subframe #0) (S802). The eNB 810 decodes the UL data received from the UE 820 and generates ACK/NACK. When the eNB 810 has not been successfully decoded the UL data, the eNB 810 transmits NACK to the UE 820 (S804). The UE 820 retransmits the UL data 4 subframes after NACK is received (S806). Initial transmission and retransmission of the UL data are performed by the same HARQ process (e.g. HARQ process #4).

Hereinafter, cooperative multipoint transmission/reception (CoMP) will be described.

A system after LTE-A has attempted to introduce a scheme for raising system performance by enabling cooperation among a plurality of cells. Such a scheme is called CoMP. CoMP refers to a scheme for two or more eNBs, access points, or cells to cooperatively communicate with a specific UE for smooth communication between the UE and the eNBs, access points, or cells. In the present invention, eNB, access point, and cell may have the same meaning.

Figure 9:
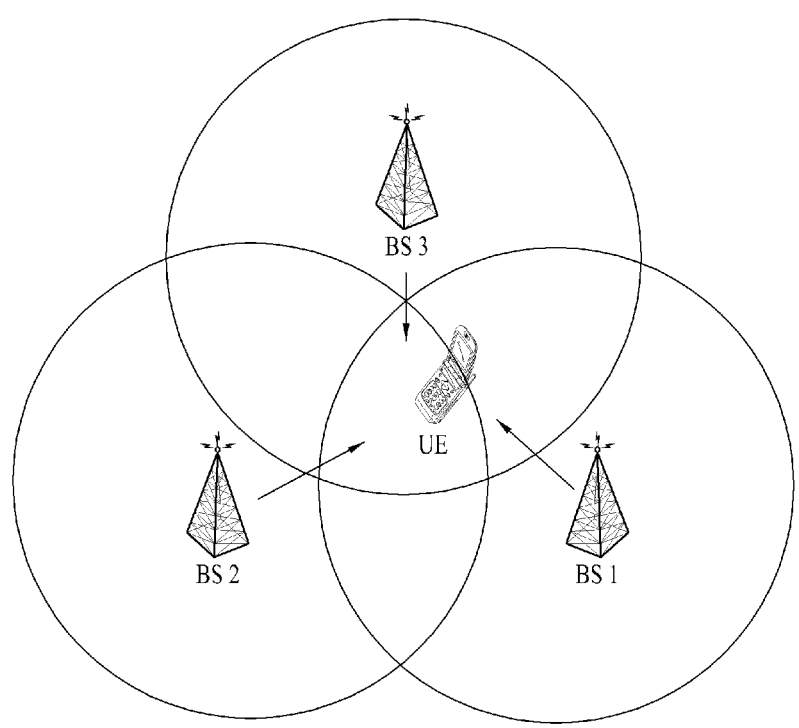
FIG. 9 illustrates an example of performing CoMP.

FIG. 9 illustrates an example of performing CoMP. Referring to FIG. 9, a radio communication system includes a plurality of BSs BS1, BS2, and BS3 that perform CoMP and a UE. The BSs BS1, BS2, and BS3 for performing CoMP may efficiently transmit data to the UE through cooperation. CoMP may be broadly divided into two schemes:

Joint processing (CoMP joint processing: CoMP-JP)
CoMP-coordinated scheduling/beamforming (CoMP-CS)
In the case of CoMP-JP, data is simultaneously transmitted from eNBs performing CoMP to one UE and the UE combines signals received from the eNBs to improve reception performance. In the case of CoMP-CS, data is transmitted to one UE through one eNB at an arbitrary time and scheduling or beamforming is performed such that interference caused by other eNBs may be minimized.

Hereinafter, carrier aggregation (CA) will be described.

To use a wider frequency band, an LTE-A system employs CA (or bandwidth aggregation) which aggregates a plurality of UL/DL frequency blocks to obtain a wider UL/DL bandwidth. Each frequency block is transmitted using a component carrier (CC). In this disclosure, the CC may be regarded as a frequency block for CA or a center frequency of the frequency block according to context. Frequency block and center frequency may be used interchangeably.

Figure 10:
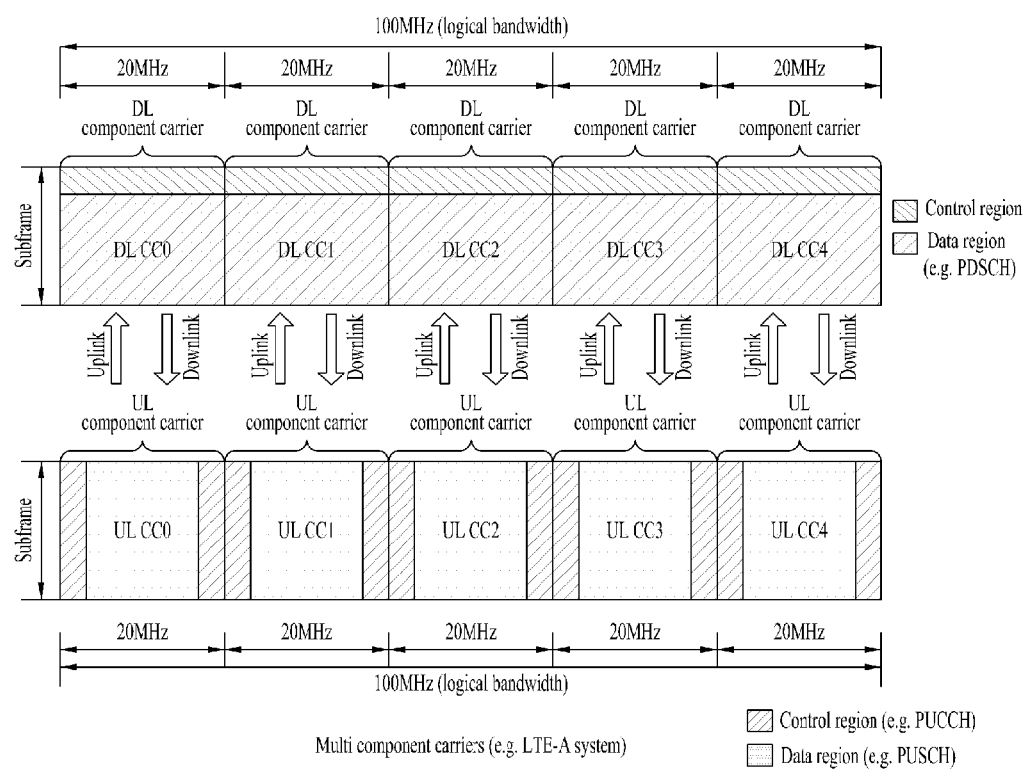
FIG. 10 illustrates an example of performing communication in a multi-CC situation.

FIG. 10 illustrates an example of performing communication in a multi-CC situation. FIG. 10 may correspond to a communication example of an LTE-A system.

Referring to FIG. 10, five 20-MHz CCs may be aggregated to support a bandwidth of 100 MHz on UL/DL. CCs may be contiguous or non-contiguous in the frequency domain. The case in which the bandwidth of a UL CC and the bandwidth of a DL CC are equal and symmetrical is shown in FIG. 10 for convenience. However, the bandwidths of the CCs may be independently determined. In addition, asymmetrical CA in which the number of UL CCs is different from the number of DL CCs may be implemented. Asymmetrical CA may occur due to limited availability of frequency bands or may be artificially generated by network configuration. For example, although the system bandwidth is configured with N CCs, a frequency band that a specific UE can receive may be limited to M (<N) CCs. Various parameters for CA may be configured cell-specifically, UE group-specifically, or UE-specifically.

Although FIG. 10 shows transmission of UL signals and DL signals through one-to-one mapped CCs, CCs over which signals are actually transmitted may be changed according to network configuration or signal type. For example, if a scheduling command is transmitted on DL through DL CCL1, data transmitted according to a scheduling command may be transmitted through another DL CC or UL CC. In addition, UL control information may be transmitted on UL through a specific UL CC regardless of whether or not mapping between CCs is performed. Similarly, DCI may be transmitted through a specific DL CC.

Figure 11:
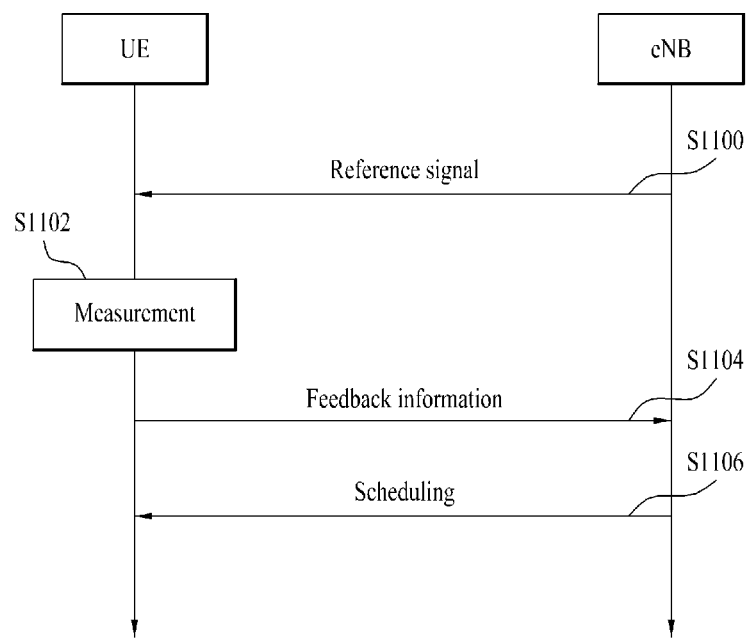
FIG. 11 illustrates a DL scheduling procedure.

FIG. 11 illustrates a DL scheduling procedure.

Referring to FIG. 11, an eNB transmits an RS to a UE (S1100). The RS includes a channel measurement RS, for example, a common reference signal (CRS) or a channel state information reference signal (CSI-RS). The UE performs channel measurement using the RS received from the eNB (S1102). Thereafter, the UE feeds back DL channel information computed through channel measurement to the eNB (S1104). The channel information fed back from the UE to the eNB includes a covariance matrix of a channel, an interference and noise signal level (e.g., a signal-to-noise ratio (SNR), a signal-to-interference-plus-noise ratio (SINR), or a carrier-to-interference-plus-noise ratio (CINR)), channel direction information, a precoding matrix indicator (PMI), a rank indicator (RI), a channel quality indicator (CQI), a received signal strength indicator (RSSI), and reference signal received quality (RSRQ). Thereafter, the eNB may perform DL scheduling with respect to the UE using the DL channel information received through the feedback information (S1106).

As a CoMP scheme, an (asymmetric) CA scheme, and a MIMO scheme supporting 8 DL transmit antennas have been introduced in LTE-A, which is recently being discussed, the amount of UL control information supporting these schemes is rapidly increased. In CoMP for example, a UE which performs CoMP should measure CSI-RSs of a cooperative neighboring cell as well as a serving cell thereof and send feedback information associated therewith to an eNB. However, in a feedback structure defined in LTE, a newly increased amount of control information cannot be reported on UL. Accordingly, there is a need for a new UL data information feedback scheme.

Accordingly, the present invention proposes a HARQ process operation method for supporting the case in which an eNB dynamically changes use of a radio resource allocated to a UE according to change of system traffic state. More specifically, the present invention proposes a HARQ process operation method for efficiently supporting the case in which the eNB dynamically changes a UL resource preallocated to the UE so as to be used for DL communication (or the case in which a preallocated DL resource is used for UL communication) according to change of system traffic state. The pre-allocated UL resource in the present invention may be allocated using at least one of an SIB, a PBCH, a paging signal, an RRC signal, a MAC signal, and an (E)PDCCH and the above channels or signals are UE-specific or cell-specific.

A HARQ scheme of an LTE system may be broadly divided into synchronous HARQ and asynchronous HARQ. Synchronous HARQ is a scheme of performing retransmission following initial transmission at timing determined by a system when initial transmission has not been successfully performed. For example, in the case of a UL HARQ process of an LTE FDD system, retransmission is performed in every fourth time unit after failure of initial transmission. Such a UL HARQ process of the LTE FDD system is predetermined between the eNB and the UE and thus there is no need to additionally transmit information about retransmission timing. However, if a data transmitting side receives a NACK message, a data/control information frame is retransmitted in every fourth time unit until the data transmitting side receives an ACK message.

In the asynchronous HARQ scheme, retransmission timing may be newly scheduled by the eNB or may be configured through additional signaling. For example, retransmission timing at which retransmission for a data/control information frame that has been transmitted by the eNB but has not been received by the UE is performed may vary according to various factors such as channel state and a DL HARQ process of an LTE FDD/TDD system is implemented by the above operation.

However, when the eNB changes a specific radio resource allocated to the UE so as to be used for DL or UL communication (as opposed to a predetermined resource use purpose) according to system traffic, maintenance of an existing HARQ process operation between the eNB and the UE causes the following problems. In the present invention, change of use of a radio resource may be defined as "use of a radio resource for purposes other than use indicated in UL-DL configuration set from SIB information" or "change of a radio resource to purposes other than a purpose configured at prior timing (based on a preset radio resource use change period)".

FIG. 12 illustrates an embodiment in which problems occur in a UL HARQ process operation when an eNB changes use of a specific radio resource so as to be used for DL or UL communication according to system traffic.

In FIG. 12, it is assumed that a TDD system is used and that an operation according to UL-DL configuration set through an SIB (e.g. "DSUUUDDDDD" according to UL-DL configuration #3) is performed. Under such an assumption, when the eNB changes use of a specific radio resource in the case of operation of one UL HARQ process as illustrated in FIG. 12(a), problems as illustrated in FIG. 12(b) may arise.

Referring to FIG. 12(a), a UE, which has performed a normal UL HARQ operation according to an existing UL HARQ timeline configured as "DSUUUDDDDD", transmits UL data (PUSCH) to the eNB in an (n+4)-th subframe (hereinafter, SF #(n+4)) based on a UL grant received in an n-th subframe (hereinafter, SF #n). If the UE receives, in an (n+10)-th subframe (hereinafter, SF #(n+10)), NACK for the UL data transmitted to the eNB, retransmission for the previous UL data (i.e. for the PUSCH transmitted in the (n+4)-th subframe) is performed in an (n+14)-th subframe (hereinafter, SF #(n+14)).

However, if the eNB changes use of SF #(n+14) to DL communication from UL communication due to traffic increase of DL data communication in a system as illustrated in FIG. 12(b), the UE cannot perform retransmission for the previous UL (i.e. SF #(n+4)) data in SF #(n+14). Accordingly, a UL HARQ process operation (or configuration) cannot be normally performed unless an additional rule (or operation of the UE) for solving such problem is defined in the system.

Since UL of LTE adopts a synchronous retransmission scheme in which retransmission timing is predetermined as a specific subframe, in the case of FIG. 12(b), UL data that should be retransmitted in SF #(n+14) can be retransmitted only in SF #(n+24) through an additional time delay of at least 10 ms. Consequently, a time delay of a corresponding UL HARQ process is increased.

Accordingly, the present invention proposes a HARQ process operation scheme for efficiently supporting a dynamic change operation of use of a radio resource when the eNB dynamically changes use of a specific radio resource allocated to the UE.

According to the present invention, when it is judged that an existing HARQ process cannot be normally maintained due to dynamic change of use of a specific radio resource, a method is proposed for continuously performing at least one of a (re)transmission operation and ACK/NACK transmission/reception operation of the existing HARQ process through another HARQ process using a (predefined) partially asynchronous HARQ scheme.

For example, it is assumed that N UL HARQ processes of specific UL-DL configuration allocated through an SIB in a TDD system are currently used. If use of a previously configured UL radio resource is changed to use for a DL radio resource, a corresponding UL HARQ process may operate to dynamically change a HARQ process actually used at every timing while using the same transmission and reception timing as some or all of the other (N−1) HARQ processes according to a predetermined rule.

In more detail, the present invention has a characteristic of a synchronous HARQ scheme in that some HARQ processes can perform retransmission not at all timings but at partially selected timings (shared by the HARQ processes) and simultaneously has a characteristic of an asynchronous HARQ scheme in that one of the HARQ processes is dynamically selected and performs retransmission within selected timings shared by the HARQ processes. That is, if use of a radio resource is dynamically changed due to system traffic in the present invention, (N−1) HARQ processes except for a HARQ process used for supporting a partially asynchronous HARQ scheme of a HARQ process which is judged not to be able to perform normal communication may be operated by an existing synchronous HARQ scheme.

Figure 13:
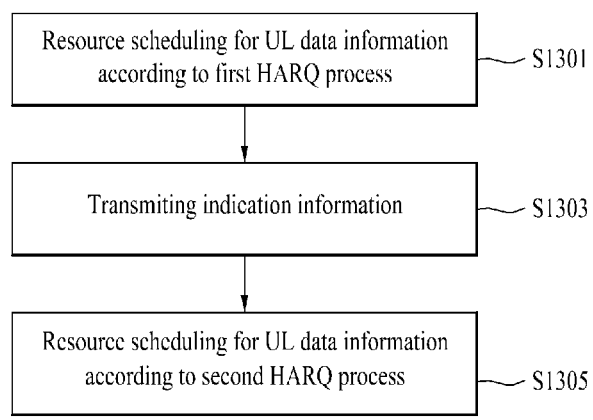
FIG. 13 is a view referred to for describing UL resource scheduling using HARQ according to an embodiment of the present invention.

FIG. 13 is a view referred to for describing UL resource scheduling using HARQ according to an embodiment of the present invention.

When it is judged that a HARQ process performed by a UE according to preset UL-DL configuration in present invention (hereinafter, a designated HARQ process) cannot be maintained due to change of use of a specific radio resource in the designated HARQ process, a method for continuously performing at least one of a (re)transmission operation and an ACK/NACK transmission/reception operation of the designated HARQ process through another HARQ process using a (predefined) partially asynchronous HARQ scheme will now be described with reference to FIG. 13.

A method for performing the (re)transmission operation and/or ACK/NACK transmission and reception operation associated with the designated HARQ process through another HARQ process is defined in a detailed description of the present invention as a method in which one HARQ process uses another HARQ process. Alternatively, the method may be defined as a method in which two or more HARQ processes share a HARQ timeline (i.e. a subframe in which UL/DL control/data information is transmitted and received) so that the designated HARQ process uses, at specific timing, a radio resource of corresponding timing for the (re)transmission operation and/or the ACK/NACK transmission/reception operation and another HARQ process sharing the (corresponding) HARQ timeline uses, at another timing, a radio resource of corresponding timing for the (re)transmission operation and/or the ACK/NACK transmission/reception operation. Alternatively, the method may be defined as a method in which one HARQ process is additionally assigned HARQ timelines operated based on one or more other HARQ processes so as to use a HARQ timeline linked with one specific HARQ process at one timing and use a HARQ timeline linked with another (additionally allocated) HARQ process at another timing.

In the present invention, a HARQ timeline may be indicated by an index of a subframe in which UL data corresponding to control information (UL grant or PHICH) transmitted in a specific subframe is transmitted and by an index of a subframe in which a PHICH corresponding to the UL data is transmitted. The HARQ timeline according to the present invention may reuse a preset HARQ timeline (e.g. a HARQ timeline of a UL-DL configuration different from a UL-DL configuration for an operating HARQ timeline) or may be newly defined.

Hereinbelow, embodiments of the present invention are based on an assumption that one (representative) HARQ process is additionally assigned a HARQ timeline operated based on another HARQ process. That is, the present invention is described by defining a currently used (representative) HARQ process of two HARQ processes as "HARQ process #A" and a HARQ process usable in the present invention (according to a partially asynchronous HARQ scheme) as "HARQ process #B". Hereinafter, while description will be given under the assumption that there are two HARQ processes, the present invention may be applied to the case in which one HARQ process is additionally assigned HARQ timelines operated based on two or more HARQ processes.

In the present invention, an operation scheme and relationship setup between HARQ process #A and HARQ process #B may be predefined. In the present invention, HARQ process #A and HARQ process #B may be defined as UL-DL configuration based HARQ processes configured through an SIB (or a PBCH or a paging signal), UL-DL configuration based HARQ processes configured through a higher layer signal (e.g. UE-dedicated RRC signaling, UE-specific MAC signaling, cell-specific RRC signaling, or cell-specific MAC signaling), or HARQ process #B used through change at specific timing (e.g. HARQ process #B used through change to HARQ process #A (or a timeline of HARQ process #A) based on a HARQ process change command (or indicator) received at specific timing while HARQ process #B is used).

For example, the operation scheme and relationship setup between HARQ processes may be configured by HARQ processes which can be operated by changing a corresponding HARQ process (i.e. UL-DL configuration #X) to another HARQ process (e.g. selected within UL-DL configuration #X or selected within other all UL-DL configurations) at fastest timing after specific timing at which a resource cannot be used due to change of use of the resource. Alternatively, the relationship setup between HARQ processes may be configured by HARQ processes which are not affected by change of use of a resource among HARQ processes based on a new UL-DL configuration (UL-DL configuration #Y) including a UL subframe set and/or a DL subframe set of an existing UL-DL configuration (e.g. UL-DL configuration #X) (e.g. included in a UL subframe set and/or a DL subframe set of UL-DL configuration #A). Desirably, a rule and information (regarding an operation scheme and relationship setup) defined for a HARQ process in the present invention may be shared through a higher layer signal or physical layer signal between an eNB and a UE.

The eNB schedules a resource for UL data information according to a designated HARQ process based on information about an operation scheme and relationship setup (e.g. UL-DL configuration) defined between the eNB and the UE (S1301). In the present invention, the data information may include UL data (e.g. PUSCH) or UL control information (UCI) requiring feedback.

After the eNB and the UE establish the operation scheme and relation configuration for a HARQ process, the eNB transmits indication information about a HARQ process other than the designated HARQ process at specific timing to the UE (S1303).

According to the present invention, the indication information may include a predefined indicator or parameter and the eNB may inform the UE of information about a next HARQ process through the indication information.

For example, the eNB may inform the UE which one of "HARQ process #A" and "HARQ process #B" should be performed, through the predefined indicator. Desirably, in the present invention, the indicator (or parameter) may be transmitted through a physical control channel and the UE may receive the indicator (or parameter) by blind-decoding (BD) the physical control channel region (e.g. UE-specific search space (USS) or common search space (CSS)) at specific timing. In the present invention, the indicator or parameter may be transmitted through a system information transmission channel (e.g. an SIB, a PBCH, or a paging signal) or a higher layer signal (e.g. an RRC or MAC signal).

The indicator (or parameter) may be configured by adding a new field of corresponding use to a legacy DCI format. For example, a legacy LTE system has a characteristic of equally configuring lengths and payload sizes of a specific DCI format used for UL scheduling (e.g. DCI format 0) and a specific DCI format used for DL scheduling (e.g. DCI format 1A) in consideration of the (maximum) number of BD operations of the UE. Accordingly, if the new field in which the indicator (or parameter) is transmitted is added to the legacy DCI format, both the DCI format size for specific UL scheduling and the DCI format size for specific DL scheduling may be increased in order to maintain compatibility with the legacy system (or to avoid increase in the (maximum) number of BD operations of the UE).

Accordingly, as an embodiment of the present invention, the field added to a specific DCI format used for UL scheduling (e.g. DCI format 0) may be used to indicate a type of a UL HARQ process selected by the eNB and the field added to a specific DCI format used for DL scheduling (e.g. DCI format 1A) may be used for the eNB to indicate whether use of a specific (position) radio resource is changed (or to indicate change information of use of a specific (location) radio resource or change information of UL-DL configuration). A description will be given of the case in which the eNB changes a resource (i.e. SF #n) previously configured for UL communication to the purpose of DL communication by way of example. The eNB may inform the UE of information for changing a resource (SF #n) previously configured for UL communication to the purpose of DL communication and scheduling information for DL communication by transmitting DCI used for DL scheduling including a new field at predetermined specific timing (e.g. timing at which scheduling information of an existing UL resource (UL grant) is transmitted). For example, in the present invention, the DCI used for DL scheduling including the new field may be DCI including a field for informing the UE of information related to change of use of a specific (location) radio resource or a field for informing the UE of change information of UL-DL configuration.

An embodiment of the present invention applied to an LTE TDD system is described. In the LTE TDD system, the size of a field indicating a HARQ process ID in a specific DCI format used for DL scheduling (e.g. DCI format 1A) is 4 bits, which is larger than the 3 bits used in an FDD system by one bit. Accordingly, the size of the DCI format used for DL scheduling and the size of a specific DCI format used for UL scheduling (e.g. DCI format 0) need to be equally maintained in consideration of the above-described (maximum) number of BD operations of the UE.

Accordingly, in present invention, the DCI format used for UL scheduling and the DCI format used for DL scheduling may have the same size by zero-padding one bit to the DCI format used for UL scheduling. Alternatively, the eNB may inform the UE of the indicator (or parameter) included in a DCI format by (re)using a zero-padding field. Desirably, a new field in which the indicator (or parameter) is transmitted at a specific location of a DCI format without additionally extending the size of the DCI format may be implemented by using a zero-padding bit.

If there is no usage change of a radio resource affecting a HARQ process operation linked with a subframe of specific timing, an operation based on only one HARQ process may be sufficiently performed in subframes of some timings. In this case, a new field (bit) added to an existing DCI format may be eliminated or information (or bit) according to the added new field may be used for virtual CRC. For example, when the information (or bit) according to the added new field is used for the virtual CRC, a rule may be defined for setting the information (or bit) of the new field to a predefined fixed value. In addition, even when the zero padding bit is reused for transmission of the indicator (or parameter), the related bit may be used as information associated with use of the virtual CRC or change of use of a specific (location) radio resource or information regarding change of UL-DL configuration. Desirably, the eNB may preinform the UE of reconfiguration information of the added field (or bit) or usage change information of the added field (or bit) through a higher layer signal or a physical layer signal.

In the present invention, timing at which the indicator (or parameter) is transmitted may reuse control information transmission/reception timing of a specific HARQ process. For example, the indicator (or parameter) transmission timing may reuse transmission/reception timing of UCI (UL grant), DCI (DL grant) or a PHICH of HARQ process #A or HARQ process #B (or new transmission/reception timing of UCI (UL grant), DCI (DL grant), or a PHICH of a combination of a plurality of HARQ process timelines). In this case, the UE may perform BD for a control channel while expecting to receive the indicator (or parameter) only at predefined specific timing.

Alternatively, the indicator (or parameter) may be configured to be transmitted at DCI (DL grant) or PHICH transmission/reception timing of a standalone DL subframe. Here, the standalone DL subframe refers to a subframe in which UCI (UL grant) is not transmitted. Transmission of the indicator or parameter in the standalone DL subframe is advantageous in that there is no need to extend an SS or increase the (maximum) number of BD operations.

Additionally, according to present invention, if it is judged that an existing HARQ process cannot be maintained due to change of use of a specific radio resource, a (re)transmission operation and/or an ACK/NACK transmission/reception operation of the corresponding HARQ process (judged to be unable to be maintained) may be continuously performed through another HARQ process using a partially asynchronous HARQ scheme based on a predefined implicit rule.

For example, it is assumed that one HARQ process (hereinafter, HARQ process #A) is additionally assigned a HARQ timeline operated based on another HARQ process (hereinafter, HARQ process #B). It is also assumed that an operation scheme and relationship setup between HARQ process #A and HARQ process #B are predefined and are shared through a higher layer signal or a physical layer signal between the eNB and the UE. In this case, even when the eNB successfully receives UL data transmitted from the UE (at UL operation timing of a HARQ process) and thus transmits information indicating "PHICH is ACK" at PHICH transmission timing of UL HARQ process #A linked with the HARQ process, the eNB may transmit information indicating "UL grant is untoggled state" to the UE.

In more detail, the eNB may implicitly indicate that HARQ process #A has been changed to predefined HARQ process B by transmitting a toggle bit (e.g. an NDI field or another type of information) of a UL grant in the form of retransmission indication although the eNB may command the UE to transmit new data due to success of UL data reception. The implicit operation rule and application between the eNB and the UE according to the present invention is desirably prescheduled or preconfigured through a higher layer signal or a physical layer signal between the eNB and the UE.

Upon receiving the above-described indication information from the eNB, the UE is assigned rescheduling of a resource for UL data information transmission according to a HARQ process other than the designated HARQ process (S1305). Accordingly, the UE may (re)transmit the UL data information using the rescheduled radio resource.

Figure 14:
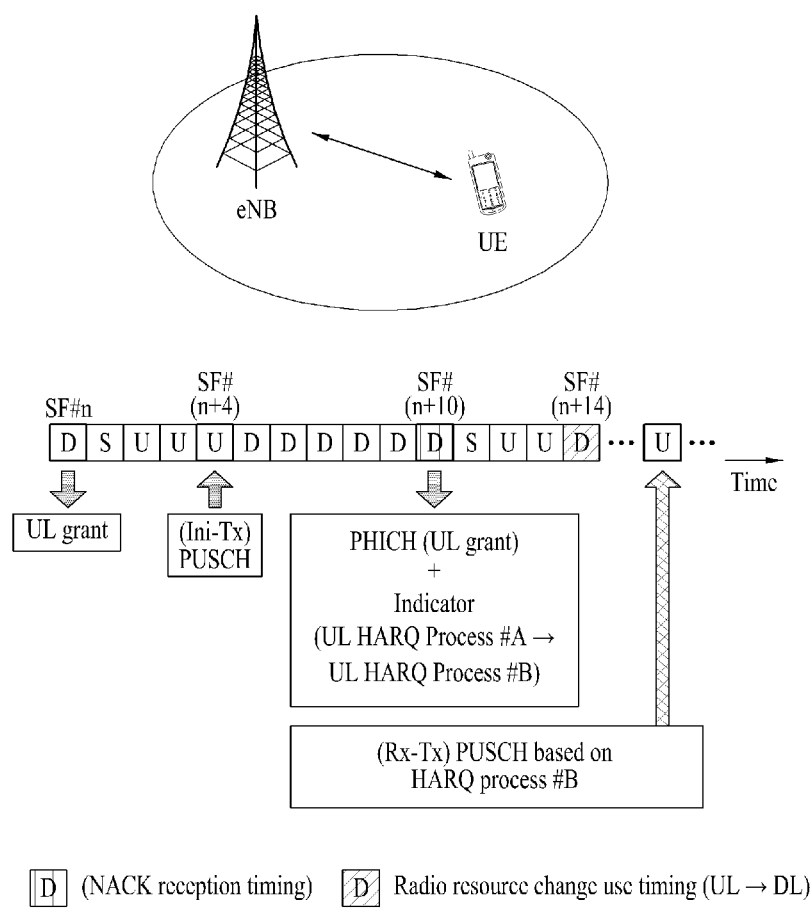
FIG. 14 illustrates a HARQ timeline of another predefined HARQ process using indication information according to the present invention.

FIG. 14 illustrates a HARQ timeline of another predefined HARQ process using indication information (indicator or parameter) according to the present invention.

Referring to FIG. 14, a situation in which one HARQ process is additionally assigned a HARQ timeline operated based on another HARQ process, i.e. a situation in which two selectable HARQ processes (hereinafter, HARQ process #A and HARQ process #B) are present, is assumed.

The UE receives an indicator (or parameter) indicating a change operation between HARQ processes (e.g. from HARQ process #A to HARQ process #B) in SF #(n+14) through a physical control channel from the eNB and retransmits previous UL data in SF #(n+k) based on changed HARQ process #B. Desirably, the indicator (or parameter) may be transmitted using a new field added to a DCI format (e.g. DCI format #0). In addition, a change operation and relationship setup between HARQ processes in FIG. 14 may be predefined and then may be shared through a higher layer signal (or physical layer signal) between the eNB and the UE.

Hence, according to an embodiment of the present invention, a HARQ process operation problem generated when the eNB dynamically changes use of a specific radio resource according to system traffic can be solved by using a predefined indicator (or parameter).

Hereinafter, an embodiment of the present invention applicable to a wireless communication system will be described in more detail. While a UL HARQ operation situation is assumed for convenience of description, proposed methods of the present invention can be applied to a DL HARQ operation as well.

Figure 16:
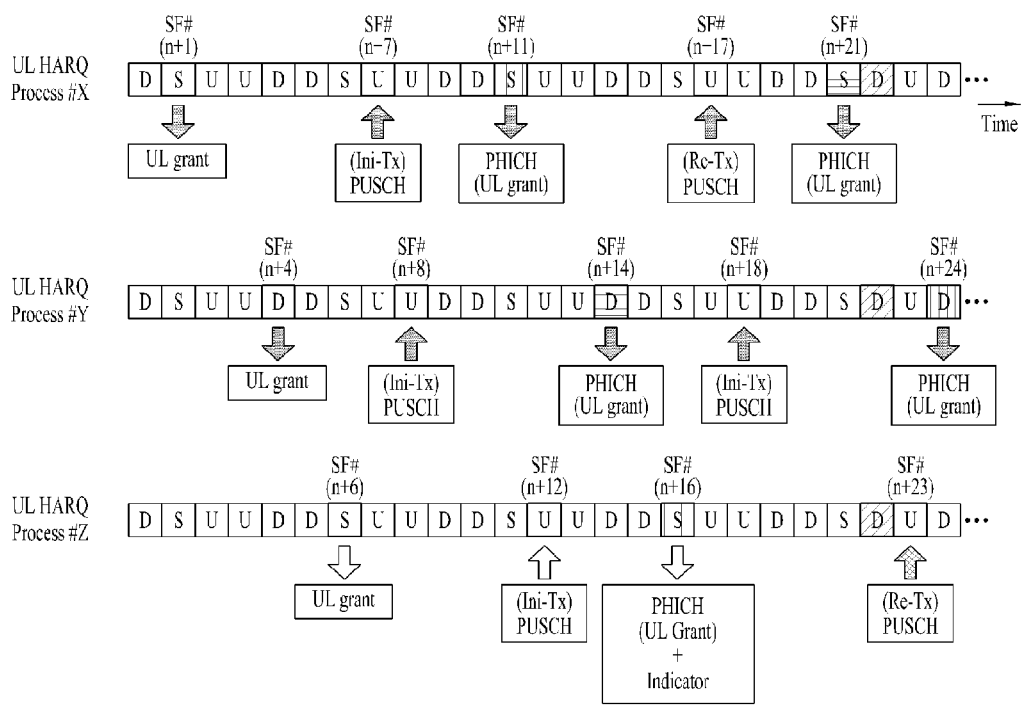
FIG. 16 illustrates an embodiment of the present invention when a HARQ timeline is determined according to timing at which UL scheduling information is received and use of a radio resource is dynamically changed.

FIG. 15 illustrates definition of a change operation and relationship between preset HARQ processes and FIG. 16 illustrates an embodiment of the present invention when a UL HARQ process and a HARQ timeline linked with the UL HARQ process are determined according to timing at which scheduling information of a UL resource (i.e. UL scheduling information) based on FIG. 15 is received and when use of a radio resource is dynamically changed.

According to the embodiment of the present invention, a UL HARQ process and a HARQ timeline linked with the UL HARQ process are determined by timing at which scheduling information of a UL resource for UL data transmission (e.g. UL grant for (initial) PUSCH (re)transmission) is received. Next, if there is a probability of being unable to normally maintain the HARQ process by dynamic change of use of a radio resource, a HARQ timeline of another predefined HARQ process may be indicated through an indicator (or parameter).

As described above, the HARQ process to which the present invention is applied may use only a HARQ timeline of a newly defined HARQ process or may be operated based on a changed HARQ process and a changed HARQ timeline after timing at which the indicator (or parameter) is received by changing the HARQ process to the newly defined HARQ process.

In FIG. 16, it is assumed that UL-DL configuration set through an SIB is "DSUUDDSUUD" based on UL-DL configuration #1 of Table 2 and that one HARQ process is additionally assigned a HARQ timeline operated based on another HARQ process. It is also assumed that three HARQ processes (hereinafter, UL HARQ process #X, UL HARQ process #Y, and UL HARQ process #Z) are currently used and that use of a resource in SF #(n+22) is changed to DL communication from existing UL communication.

In FIG. 16, since UCI (UL grant) reception timing is SF #(n+1), UL HARQ process #X is determined to be UL HARQ process #B as illustrated in FIG. 15. Similarly, UL HARQ process #Y receiving UCI (UL grant) in SF #(n+4) is determined to be UL HARQ process #D and UL HARQ process #Z receiving UCI (UL grant) in SF #(n+6) is determined to be UL HARQ process #A.

Accordingly, since an operation of UL HARQ process #Z has a problem in an existing UL HARQ process due to change of use of a resource of SF #(n+22) in FIG. 16, the eNB may transmit an indicator (or parameter) (e.g. an indicator (or parameter) transmitted using a new field added to DCI format 0) indicating change between HARQ processes to the UE in SF #(n+16) corresponding to PHICH reception timing of UL HARQ process #A.

The UE performs retransmission for UL data in SF #(n+23) using a HARQ timeline of a changed UL HARQ process (i.e. UL HARQ process #A') rather than a HARQ timeline based on the existing UL HARQ process (i.e. HARQ process #A) according to a predetermined change rule (e.g. change rule #1 of FIG. 15).

That is, if it is judged that the existing UL HARQ process cannot be normally maintained due to dynamic change of use of a specific radio resource, the corresponding UL HARQ process (e.g. UL HARQ process #Z) is operated by a partially asynchronous HARQ scheme according to a predefined rule and the other UL HARQ processes (e.g. UL HARQ process #X and UL HARQ process #Y) are operated by a synchronous HARQ scheme, so that an efficient UL HARQ process operation can be maintained.

Figure 17:
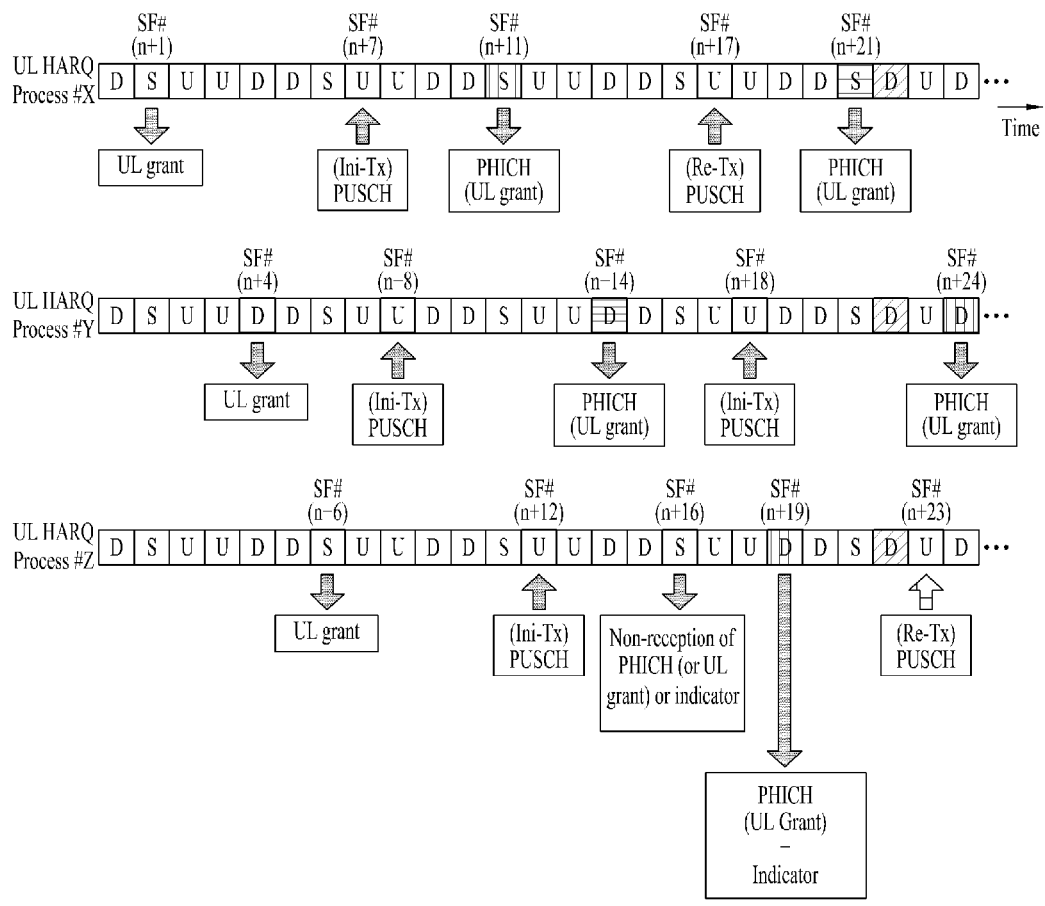
FIG. 17 illustrates another embodiment of the present invention applied when there is a probability of being unable to normally maintain a specific HARQ process due to dynamic change of use of a radio resource.

FIG. 17 illustrates another embodiment of the present invention applied when an operation is performed based on a specific UL HARQ process (i.e. designated HARQ process) of predetermined UL-DL configuration and a HARQ timeline corresponding to the UL HARQ process and (thereafter) there is a probability of being unable to normally maintain the specific HARQ process (i.e. designated HARQ process) due to dynamic change of use of a radio resource.

In this case, the eNB may inform the UE of a selected HARQ process and a corresponding HARQ timeline by transmitting indication information (indicator or parameter) to the UE at specific timing of candidate HARQ processes based on predetermined UL-DL configuration, using pre-shared change information (or rule) between HARQ processes between the eNB and the UE. For example, transmission timing of the indication information (indicator or parameter) that the eNB informs the UE may be limited to "specific timing linked with timelines of candidate HARQ processes", "specific timing linked with a timeline of a designated HARQ process", or "specific timing linked with timelines of candidate HARQ processes and a designated HARQ process".

In addition, candidate HARQ processes in the preshared change information (or rule) between HARQ processes may be restricted to HARQ processes in the same UL-DL configuration as a designated HARQ process or may be extended to HARQ processes of (predefined) UL-DL configuration different from the designated HARQ process.

For example, it is desirable that the specific timing of candidate HARQ processes be timing at which UL scheduling information (e.g. UL grant for PUSCH (re)transmission) is received or timing at which PHICH information is received. That is, the eNB may transmit the indication information including an indicator (or parameter) at PHICH reception timing of a candidate HARQ process.

The UE according to the present invention may change a HARQ process thereof by performing control channel BD for reception of the indicator (or parameter) at the timing at which the UL scheduling information (e.g. UL grant for PUSCH (re)transmission) of the candidate HARQ processes or at the timing at which the PHICH information is received.

In FIG. 17, the UE may perform BD for reception of the indication information (indicator or parameter) indicating change of a HARQ process based on a predetermined change rule between HARQ processes (e.g. change rule of FIG. 15). For example, since UL HARQ process #Z uses UL HARQ process #A, the UE may perform BD for reception of the indicator (or parameter) indicating change of a HARQ process at timings of SF #(n+16) and SF #(n+19).

Referring to FIG. 17, the UE has not received, in SF #(n+16), information (e.g. an indicator, parameter, UL grant, or PHICH) indicating that an existing UL HARQ process (i.e. UL HARQ process #Z) should be continuously used from the eNB through a control channel and has received, in SF #(n+19), information (e.g. an indicator or parameter) indicating that the existing UL HARQ process (i.e. UL HARQ process #Z) should be changed to another predefined HARQ process and/or PHICH (or UL grant) information about UL data transmission performed at previous timing (e.g. SF #(n+12), through the control channel.

Accordingly, the UE changes the existing HARQ process (UL HARQ process #A) to another predefined HARQ process (UL HARQ process #A') based on the received information and continues to perform a UL HARQ operation based on a HARQ timeline of the changed HARQ process.

According to the present invention, if commands indicating that a HARQ process should be changed to a specific HARQ process are contradictory, this may be processed according to a predetermined rule. For example, it is assumed that the UE receives an indicator (or parameter) indicating that a (re)transmission operation and an ACK/NACK transmission/reception operation for a currently used HARQ process (e.g. HARQ process #A) should be continuously performed based on another predefined HARQ process (e.g. HARQ process #B) from the eNB through a physical control channel. In this case, if the UE rereceives a retransmission command (e.g. NACK (PHICH)) for HARQ process #A in a HARQ timeline based on HARQ process #A before the command indicating change (or use) of a HARQ process is (actually) performed, the UE regards the previously received command for operation of change between HARQ processes as an incorrect command and my not change the HARQ process. Alternatively, the UE regards the later received command for retransmission of the existing HARQ process (i.e. HARQ process #A) is an incorrect command and may change the existing HARQ process to another predefined HARQ process (i.e. HARQ process #B).

The present invention may be applied to a situation in which the UE receives a retransmission command (e.g. NACK (PHICH)) for a currently used HARQ process (hereinafter, HARQ process #A) from the eNB at specific timing and receives a change command indicating that the HARQ process should be changed to another predefined HARQ process (hereinafter, HARQ process #B) from the eNB before the retransmission command is (actually) executed.

A physical control channel to which the present invention is applied may mean a 'legacy PDCCH' or an 'enhanced PDCCH (EPDCCH) transmitted in a DL data (PDCCH) transmission region instead of the (legacy) PDCCH'. In the present invention, a DL data transmission region is defined as a region including OFDM symbols except for some of front OFDM symbols used for DL control channel (PDCCH) transmission in a subframe including a plurality of OFDM symbols. As another example, the DL data transmission region may also be defined as a region including all OFDM symbols of a subframe in the case in which all OFDM symbols of a subframe are designated and used as the DL data transmission region due to absence of OFDM symbols used for PDCCH transmission (or due to non-transmission of an RS (e.g. CRS) used for PDCCH decoding).

According to the present invention, the UE may perform a change operation between HARQ processes based on a predefined operation rule or an indicator (or parameter) irrespective of whether use of a radio resource of the eNB is changed (or whether a use change mode of a radio resource is configured) (at specific timing). Additionally, only when the eNB changes use of a radio resource (at specific timing) (or only when a use change mode of a radio resource is configured), a rule may be defined such that the UE performs the change operation between HARQ processes based on the predefined operation rule or the indicator (or parameter).

An embodiment of the present invention may be selectively applied to either a UL HARQ process or a DL HARQ process of a system or may be applied to both the UL HARQ process and the DL HARQ process of the system.

In the present invention, the change operation between HARQ processes may be restricted and configured to use only a HARQ process which is not (currently) used in preset UL-DL configuration. For example, if all HARQ processes are used when the change operation between HARQ processes is needed, an (existing) specific HARQ process may be configured to be forcibly terminated.

According to the present invention, a situation is assumed in which one HARQ process is selected from among a plurality of candidate HARQ processes preset through an indicator (or parameter) transmitted through a control channel for the change operation of a specific HARQ process and some HARQ timelines of selectable HARQ processes overlap at specific timing. In this case, a control/data channel transmission/reception operation performed (later) in HARQ timelines based on candidate HARQ processes which are not selected through the indicator (or parameter) may be configured not to be performed.

For example, it is assumed that one HARQ process is selected from among all or some HARQ processes which may be used in UL-DL configuration (e.g. UL-DL configuration #0 or UL-DL configuration #6) preset through the indicator (or parameter) transmitted through a control channel for the change operation of a specific HARQ process and that an index of a subframe index in which UL data corresponding to a UL grant/PHICH transmitted in some HARQ timelines (e.g. specific subframe) between selectable HARQ processes is transmitted and an index of a subframe in which a PHICH corresponding to the UL data is transmitted overlap. In this case, according to the present invention, a later performed control/data channel transmission/reception operation in HARQ timelines based on HARQ processes which are not selected through the indicator (or parameter) may be configured to be not performed or to be omitted.

As another scheme, the (control/data channel) transmission/reception operation which is not performed (or which is omitted) may be configured to be reperformed at fastest valid timing (e.g. timing which does not overlap with a HARQ timeline of a HARQ process selected through the indicator (or parameter)).

The present invention may be applied to all cases in which existing UL/DL communication cannot be performed (or maintained) at a specific resource (time/frequency) location for various reasons. As an embodiment of the present invention, the above cases correspond to "the case in which an almost blank subframe (ABS) for enhanced inter-cell interference coordination (eICIC) is configured for communication between a receiving side and a transmitting side", "the case in which UL-DL configuration (or ABS configuration) per CC(s) used for communication between a receiving side and a transmitting side in a CA environment is differently set" or "the case in which a resource at specific timing between a receiving side and a transmitting side cannot be used for communication (e.g. (backhaul link) communication between an eNB and a relay or (access link) communication between a relay and a UE)". The present invention is applicable to the case in which the indicator (or parameter) indicating information related to dynamic change of use of a radio resource is transmitted through a system information transmission channel (e.g. an SIB, a PBCH, or a paging signal), a higher layer signal (e.g. RRC or MAC), or a control information transmission channel of a physical layer (e.g. PDCCH or EPDCCH). The present invention may be configured to be limitedly applied only when the eNB configures a use change mode of a radio resource. The present invention may be independently implemented or may be implemented in combination.

Figure 18:
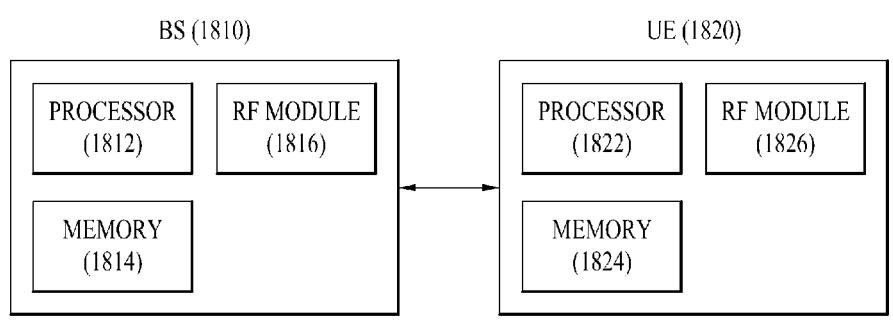
FIG. 18 illustrates a BS and a UE that are applicable to an embodiment of the present invention.

FIG. 18 illustrates a BS and a UE that are applicable to an embodiment of the present invention. If a wireless communication system includes a relay, communication in a backhaul link is performed between the BS and the relay and communication in an access link is performed between the relay and the UE. Accordingly, the BS or the UE shown in FIG. 18 may be replaced with the relay according to situation.

Referring to FIG. 18, a wireless communication system includes a BS 1810 and a UE 1820. The BS 1810 includes a processor 1812, a memory 1814, and a radio frequency (RF) unit 1816. The processor 1812 may be configured to perform the proposed procedures and/or methods according to the present invention. The memory 1814 is connected to the processor 1812 and stores various types of information related to operations of the processor 1812. The RF unit 1816 is connected to the processor 1812 and transmits and/or receives radio signals. The UE 1820 includes a processor 1822, a memory 1824, and an RF unit 1826. The processor 1822 may be configured to perform the proposed procedures and/or methods according to the present invention. The memory 1824 is connected to the processor 1822 and stores various types of information related to operations of the processor 1822. The RF unit 1826 is connected to the processor 1822 and transmits and/or receives radio signals. The BS 1810 and/or the UE 1820 may include a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method for transmitting UL data information in a wireless communication system and the apparatus therefor have been described centering on an example applied to a 3GPP LTE system, the present invention is applicable to a variety of wireless communication systems in addition to the 3GPP LTE system.

The invention claimed is:

1. A method for transmitting uplink data information using a hybrid automatic repeat request (HARQ) of a user equipment in a wireless communication system, the method comprising:
   configuring at least one first uplink subframe for transmitting HARQ feedback according to a first HARQ process;
   receiving, from a base station, downlink scheduling information in a downlink control information (DCI) format 1A, wherein the downlink scheduling information indicates a second uplink subframe to be used for a downlink;
   changing the indicated second uplink subframe among the at least one first uplink subframe to a downlink subframe;
   receiving uplink scheduling information in a DCI format 0 indicating that the first HARQ process is changed to a second HARQ process from the base station;
   configuring, based on the second HARQ process, at least one third uplink subframe other than the indicated second uplink subframe for transmitting the HARQ feedback according to the second HARQ process; and
   transmitting the HARQ feedback using the configured at least one third uplink subframe.

2. The method according to claim 1, wherein the configured at least one third uplink subframe according to the second HARQ process is different from the at least one first uplink subframe.

3. The method according to claim 1, wherein the first HARQ process and the second HARQ process are determined from a HARQ process set based on configuration information including the uplink scheduling information.

4. The method according to claim 3, wherein the first HARQ process is determined by the time that the uplink scheduling information is received.

5. A user equipment for transmitting uplink data information using a hybrid automatic repeat request (HARQ) in a wireless communication system, the user equipment comprising:
   a radio frequency (RF) unit; and
   a processor configured to control the RF unit,
   wherein the processor is further configured to:
      configure at least one first uplink subframe for transmitting HARQ feedback according to a first HARQ process,
      receive, from a base station, downlink scheduling information in a downlink control information (DCI) format 1A, wherein the downlink scheduling information indicates a second uplink subframe to be used for a downlink,
      change the indicated second uplink subframe among the at least one first uplink subframe to a downlink subframe,
      receive uplink scheduling information in a DCI format 0 indicating that the first HARQ process is changed to a second HARQ process from the base station,
      configure, based on the second HARQ process, at least one third uplink subframe other than the indicated second uplink subframe for transmitting the HARQ feedback, and
      transmit the HARQ feedback using the configured at least one third uplink subframe.

6. The user equipment according to claim 5, wherein the configured at least one third uplink subframe according to the second HARQ process is different from the at least one first uplink subframe.

7. The user equipment according to claim 5, wherein the first HARQ process and the second HARQ process are determined from a HARQ process set based on configuration information including the uplink scheduling information.

8. The user equipment according to claim 7, wherein the first HARQ process is determined by the time that the uplink scheduling information is received.

* * * * *